United States Patent
Angelova et al.

(10) Patent No.: US 11,734,847 B2
(45) Date of Patent: Aug. 22, 2023

(54) IMAGE DEPTH PREDICTION NEURAL NETWORKS

(71) Applicant: Google LLC, Mountain View, CA (US)

(72) Inventors: Anelia Angelova, Sunnyvale, CA (US); Martin Wicke, San Francisco, CA (US); Reza Mahjourian, Austin, TX (US)

(73) Assignee: Google LLC, Mountain View, CA (US)

( * ) Notice: Subject to any disclaimer, the term of this patent is extended or adjusted under 35 U.S.C. 154(b) by 105 days.

(21) Appl. No.: 17/150,291

(22) Filed: Jan. 15, 2021

(65) Prior Publication Data

US 2021/0233265 A1 Jul. 29, 2021

Related U.S. Application Data

(63) Continuation of application No. 16/332,991, filed as application No. PCT/US2017/051070 on Sep. 12, 2017, now Pat. No. 10,929,996.

(Continued)

(51) Int. Cl.
| | |
|---|---|
| *G06T 7/55* | (2017.01) |
| *G06T 3/40* | (2006.01) |
| *G06N 3/08* | (2023.01) |
| *G06T 15/20* | (2011.01) |
| *G06N 3/044* | (2023.01) |

(Continued)

(52) U.S. Cl.
CPC ............... *G06T 7/55* (2017.01); *G06N 3/044* (2023.01); *G06N 3/045* (2023.01); *G06N 3/08* (2013.01); *G06T 3/40* (2013.01); *G06T 15/205* (2013.01); *G06T 7/579* (2017.01); *G06T 2207/10016* (2013.01); *G06T 2207/10028* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

| | | |
|---|---|---|
| 6,526,167 B1 | 2/2003 | Numaoka |
| 2016/0232440 A1 | 8/2016 | Gregor et al. |

FOREIGN PATENT DOCUMENTS

| | | |
|---|---|---|
| CN | 102750702 | 10/2012 |
| CN | 104615983 | 5/2015 |

(Continued)

OTHER PUBLICATIONS

Reza Mahjourian, Martin Wicke, Anelia Angelova, "Geometry-Based Next Frame Prediction from Monocular Video", arXiv:1609.06377v1 [cs.LG] Sep. 20, 2016 (Year: 2016).*

(Continued)

*Primary Examiner* — Jiangeng Sun
(74) *Attorney, Agent, or Firm* — Fish & Richardson P.C.

(57) ABSTRACT

A system includes an image depth prediction neural network implemented by one or more computers. The image depth prediction neural network is a recurrent neural network that is configured to receive a sequence of images and, for each image in the sequence: process the image in accordance with a current internal state of the recurrent neural network to (i) update the current internal state and (ii) generate a depth output that characterizes a predicted depth of a future image in the sequence.

20 Claims, 4 Drawing Sheets

Related U.S. Application Data (60) Provisional application No. 62/395,326, filed on Sep. 15, 2016.

(51) Int. Cl.
*G06N 3/045* (2023.01)
*G06T 7/579* (2017.01)

(56) References Cited

FOREIGN PATENT DOCUMENTS

| CN | 105868829 | 8/2016 |
|---|---|---|
| CN | 106096729 | 11/2016 |
| CN | 110009427 | 7/2019 |
| CN | 110928993 | 3/2020 |
| JP | H06-266410 | 9/1994 |
| JP | 2000-322556 | 11/2000 |
| JP | 2004-505393 | 2/2004 |
| JP | 2011-118891 | 6/2011 |
| JP | 2016-071697 | 5/2016 |

OTHER PUBLICATIONS

JP Office Action in Japanese Application No. 2020-207460, dated Jan. 21, 2022, 6 pages (with English translation).
Mahjourian, "Geometry-Based Next Frame Prediction from Monocular Video" IEEE, 2017, 8 pages.
Sun et al, Depth Estimation from Monocular Infrared Images Based on BP Neural Network Model, IEEE, 2012, 5 pages.
Yanase et al, "A study of object size estimation from a single image" The Institute of Image Information and Television Engineers, Sep. 2016, 2 pages (with English abstract).
Abadi et al., "TensorFlow: A System for Large-Scale Machine Learning", Proceedings of the 12th USENIX Symposium on Operating Systems Design and Implementation (OSDI '16), Nov. 2016, pp. 265-284, 21 pages.
Alvarez et al., "Road Scene Segmentation from a Single Image", European Conference on Computer Vision, 2012, pp. 376-389, 14 pages.
Ba et al., "Layer Normalization", arXiv 1607.06450v1, Jul. 21, 2016, 14 pages.
Bahlmann et al., "A System for Traffic Sign Detection, Tracking, and Recognition using Color, Shape and Motion Information", Intelligent Vehicles Symposium, 2005, 6 pages.
Becker et al., "Variational Recursive Joint Estimation of Dense Scene Structure and Camera Motion from Monocular High Speed Traffic Sequences", International Journal of Computer Vision, Dec. 2013, 105(3): 269-297.
Benenson et al., "Ten Years of Pedestrian Detection, What Have We Learned?" European Conference on Computer Vision, 2014, pp. 613-627, 15 pages.
Berjon et al, "Evaluation of backward mapping DIBR for FVV applications" IEEE, 2011, 6 pages.
Caraffi et al., "A System for Real Time Detection and Tracking of Vehicles from a Single Car-Mounted Camera", 15th International IEEE Conference on Intelligent Transportation Systems, 2012, pp. 975-982, 8 pages.
Chen et al., "Knn Matting", IEEE Transactions on Pattern Analysis and Machine Intelligence, Sep. 2013, 35(9): 2175-2188, 8 pages.
Chen et al., "Single Image Depth Perception in the Wild", 30th Conference on Neural Information Processing Systems, 2016, 9 pages.
Choy et al, "3D-R2N2: A Unified Approach for Single and Multi-view 3D Object Reconstruction," arXiv, Apr. 2, 2016, 17 pages.
CN First Office Action in Chinese Appln. No. 201780056919, dated Oct. 23, 2019, 13 pages (with Machine translation).
Dollar et al., "Pedestrian Detection: An Evaluation of the State of the Art", IEEE Transactions on Pattern Analysis and Machine Intelligence, Apr. 2012, 34(4):743-761.

Dosovitskiy et al., "FlowNet: Learning Optical Flow with Convolutional Networks", IEEE International Conference on Computer Vision (ICCV), 2015, pp. 2758-2766, 9 pages.
Eigen et al., "Predicting Depth, Surface Normals and Semantic Labels with a Common Multi Scale Convolutional Architecture", IEEE International Conference on Computer Vision (ICCV), 2015, pp. 2650-2658, 9 pages.
EP extended search report in European Application No. 20172207, dated Jul. 7, 2020, 10 pages.
Finn et al., "Unsupervised Learning for Physical Interaction through Video Prediction", Advances in Neural Information Processing Systems 29, 2016, pp. 64-72.
Fragkiadaki et al., "Learning Visual Predictive Models of Physics for Playing Billiards", arXiv 1511.07404v3, Jan. 19, 2016, 12 pages.
Garg et al., "Unsupervised CNN for Single View Depth Estimation: Geometry to the Rescue", European Conference on Computer Vision, 2016, pp. 740-756, 16 pages.
Geiger et al., "3D Traffic Scene Understanding from Movable Platforms", IEEE Transactions on Pattern Analysis and Machine Intelligence, May 2014, 36(5): 1012-1025, 14 pages.
Geiger et al., "Vision Meets Robotics: The KITTI Dataset", The International Journal of Robotics Research, 2013, 32(11): 1231-1237, 7 pages.
Hochreiter et al., "Long Short-Term Memory", Neural Computation, 1997, 9(8): 1735-1780, 32 pages.
Hore et al., "Image Quality Metrics: PSNR vs. SSIM", 20th International Conference on Pattern Recogition, 2010, 4 pages.
JP Office Action in Japanese Application No. 2019-514299, dated Aug. 11, 2020, 4 pages (with English translation).
Kingma et al., "Adam: A Method for Stochastic Optimization", arXiv 1412.6980v9, Jan. 30, 2017, 15 pages.
Koch et al., "3D Reconstruction and rendering from Image Sequences," Semantic Scholar, Jan. 1, 2005, 4 pages.
Laganiere et al., "Gradual perception of structure from motion: a neural approach," IEEE Transaction on Neural Networks, May 1, 1995, 13 pages.
Laina et al., "Deeper Depth Prediction with Fully Convolutional Residual Networks", arXiv 1606.00373v2, Sep. 19, 2016, 12 pages.
Li et al., "Virtual view synthesis using backward depth warping algorithm" IEEE, 2013, 4 pages.
Mahjourian et al, "Geometry-based next grame prediction from monocular video," IEEE Intelligent Vehicles Symposium, Jun. 2017, 8 pages.
Mathieu et al., "Deep Multi-scale Video Prediction Beyond Mean Square Error", arXiv 1511.05440v6, Feb. 26, 2016, 14 pages.
Michalski et al., Modeling Deep Temporal Dependencies with Recurrent "Grammar Cells", Advances in Neural Information Processing Systems, 2014, pp. 1925-1933.
Oh et al., "Action-Conditional Video Prediction using Deep Networks in Atari Games", Advances in Neural Information Processing Systems, 2015, 9 pages.
Parthasarathy et al, "Unified random field model based neural approach to pixel labeling problems in computer vision" IEEE, 1994, 6 pages.
PCT International Preliminary Report on Patentability in International Appln. No. PCT/US2017/051070, dated Jul. 4, 2018, 8 pages.
PCT International Search Report and Written Opinion in International Appln. No. PCT/US2017/051070, dated Nov. 28, 2017, 16 pages.
Petrich et al., "Map-based Long Term Motion Prediction for Vehicles in Traffic Enviroments", 2013 IEEE Intelligent Transportation Systems Conference, Oct. 2013, pp. 2166-2172, 7 pages.
Ranzato et al, "Video (language) modeling: a baseline for generative models for natural video," arXiv, Dec. 20, 2014, 15 pages.
Rao et al., "Monocular 3D Shape Reconstruction using Deep Neural Networks", IEEE Intelligent Vehicles Symposium, 2016, pp. 310-315.
Santana et al, "Learning a driving simulator," arXiv, Aug. 3, 2016, 8 pages.
Schneider et al., "Semantic Stixels: Depth is Not Enough", IEEE Intelligent Vehicles Symposium, 2016, 8 pages.

(56) References Cited

OTHER PUBLICATIONS

Shi et al., "Convolutional LSTM Network: A Machine Learning Approach for Precipitation Nowcasting", Advances in Neural Information Processing Systems 28, 2015, pp. 802-810, 7 pages.
Srivastava et al., "Unsupervised Learning of Video Representations using LSTMs", Proceedings of the 32nd International Conference on Machine Learning, 2015, 37:1-10.
Vondrick et al., "Anticipating Visual Representations from Unlabeled Video", IEEE Conference on Computer Vision and Pattern Recognition, 2016, pp. 98-106, 9 pages.
Walker et al., "Dense Optical Flow Prediction from a Static Image", IEEE International Conference on Computer Vision, 2015, pp. 2443-2451, 9 pages.
Wang et al., "Towards Unified Depth and Semantic Prediction From a Single Image", IEEE Conference on Computer Vision and Pattern Recognition (CVPR), 2015, pp. 2800-2809, 10 pages.
Xue et al., "Visual Dynamics: Probabilistic Future Frame Synthesis via Cross Convolutional Networks", Advances in Neural Information Processing Systems, 2016, 9 pages.
tensorflow.org [online], "tf.depth_to_space," Jun. 13, 2017, retrieved on Jan. 11, 2023, retrieved from URL<http://web.archive.org/web/20170613172901/https://www.tensorflow.org/api_docs/python/tf/depth_to_space>, 3 pages.

\* cited by examiner

IMAGE DEPTH PREDICTION NEURAL NETWORKS

CROSS-REFERENCE TO RELATED APPLICATION

This patent application is a continuation (and claims the benefit of priority under 35 USC 120) of U.S. patent application Ser. No. 16/332,991, filed Mar. 13, 2019, which is a National Stage Application under 35 U.S.C. § 371 and claims the benefit of International Application No. PCT/US2017/051070, filed Sep. 12, 2017, which claims priority to U.S. Provisional Application Ser. No. 62/395,326, filed on Sep. 15, 2016. The disclosure of the prior applications is considered part of and is incorporated by reference in the disclosure of this application.

BACKGROUND

This specification relates to processing images using neural networks.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

Some neural networks are recurrent neural networks. A recurrent neural network is a neural network that receives an input sequence and generates an output sequence from the input sequence. In particular, a recurrent neural network uses some or all of the internal state of the network after processing a previous input in the input sequence in generating an output from the current input in the input sequence.

SUMMARY

This specification describes a system implemented as computer programs on one or more computers in one or more locations that can generate a prediction of a future image.

In general, one innovative aspect may be embodied in a system that includes: an image depth prediction neural network implemented by one or more computers, in which the image depth prediction neural network is a recurrent neural network that is configured to receive a sequence of images and, for each image in the sequence: process the image in accordance with a current internal state of the recurrent neural network to (i) update the current internal state and (ii) generate a depth output that characterizes a predicted depth of a future image in the sequence. The depth of an image may comprise a set of values defining the topology of a scene represented by the 2D image, in a third, depth dimension.

The system may further include an image generation subsystem configured to, for each image in the sequence: receive the depth output that characterizes the predicted depth of the future image, and generate a prediction of the future image using the depth output. The depth output may include a predicted depth value for each pixel of a plurality of pixels in the future image that represents a respective distance of a scene depicted at the pixel from a focal plane of the future image. The future image may immediately follow the image in the sequence of images. The skilled person will appreciate that the reference here to a focal plane does not imply a requirement for the presence of a physical camera.

In some implementations, the sequence of images are frames of video captured by a camera of a robotic agent or vehicle.

The image depth prediction neural network may include one or more convolutional long short-term memory (LSTM) neural network layers. This can help learn image depth structure from information distributed over space and time. The image depth prediction neural network may include one or more feedforward convolutional neural network layers.

In some implementations, the image depth prediction neural network includes a down-sampling recurrent sub-neural network followed by an up-sampling recurrent sub-network. The down-sampling recurrent sub-neural network can be configured to, for each image in the sequence: process the image to generate a down-sampled output having a lower resolution than the image. The up-sampling recurrent sub-neural network can be configured to, for each image in the sequence: process the down-sampled output for the image to generate the depth output. This can help the system to learn image depth features which are generalized across space and time.

Another innovative aspect may be embodied in a method that includes: receiving a sequence of images; and for each image in the sequence, processing the image using an image depth prediction neural network. The image depth prediction neural network is a recurrent neural network that is configured to, for each image in the sequence: process the image in accordance with a current internal state of the recurrent neural network to (i) update the current internal state and (ii) generate a depth output that characterizes a predicted depth of a future image in the sequence.

The method may further include, for each image in the sequence: receiving the depth output that characterizes the predicted depth of the future image; and generating a prediction of the future image using the depth output. The depth output may include a predicted depth value for each pixel of a plurality of pixels in the future image that represents a respective distance of a scene depicted at the pixel from a focal plane of the future image. The future image may immediately follow the image in the sequence of images.

In some implementations, the sequence of images can be frames of video captured by a camera of a robotic agent.

The image depth prediction neural network may include one or more convolutional long short-term memory (LSTM) neural network layers. The image depth prediction neural network may also include one or more feedforward convolutional neural network layers.

In some implementations, the image depth prediction neural network includes a down-sampling recurrent sub-neural network followed by an up-sampling recurrent sub-network. The down-sampling recurrent sub-neural network can be configured to, for each image in the sequence: process the image to generate a down-sampled output having a lower resolution than the image. The up-sampling recurrent sub-neural network can be configured to, for each image in the sequence: process the down-sampled output for the image to generate the depth output.

Particular embodiments of the subject matter described in this specification can be implemented so as to realize one or more of the following advantages. The subject matter described in this specification is generally directed to an image prediction system that utilizes a geometry-based approach that has many advantages over prior approaches to predict future images. Prior approaches can be categorized into model-based approaches and model-free approaches. Model-based approaches rely on strong assumptions about the environments (e.g., what kind of scenes are permissible, e.g., a bouncing ball or a rigid object) and only perform well in such restricted environments. Model-free approaches, on another hand, do not rely on any assumption about the world as they predict unstructured pixel values directly from a sequence of pixel values from previous images. The pixel values may be RGB values, monochrome values, luminance and chrominance values or any other representation of a pixel's visual properties. Model-free approaches therefore can work well in unconstrained environments. However, the resulting next images in these model-free approaches are often not optimized for visual quality.

Examples of the image prediction system described in this specification first estimate a depth map from a sequence of pixel values of previous images and then use a generative computer graphics technique to render the next pixel values of the next images using the estimated depth map. This approach may be referred to as a geometry-based approach. The depth map may be estimated using a recurrent neural network which thus does not impose any assumptions on the environments, therefore allowing the system to work well in unconstrained environments, e.g., real life environments. In addition, the generative computer graphic technique may make use of the geometry of the scene as captured in the depth map and a camera trajectory to further provide high quality predicted images.

In particular, by including a recurrent convolutional neural network, for example, that includes convolutional LSTM neural network layers instead of fully-connected layers, the system can take into account not only the current input image but a history of previous input images in order to predict a depth for a future image, and thus can use the predicted depth to produce a more accurate and realistic prediction of the future image compared to existing methods. While model-free methods produce conservative and blurry predictions (e.g., methods that use a loss function based on the pixel values, such as RGB values, in a predicted image), by using the recurrent neural network with convolutional LSTM layers, the system can produce predictions of future images with significantly higher quality and sharpness. In addition, the rich 3D representations of images can be used to simulate multiple future images ahead, allowing the system to have predictive capabilities that are useful in many situations.

The proposed method can also be used to generate hypothetical next frame predications, for example, those that would result from exploratory or hypothetical actions. This capability enables a decision making algorithm to use the next frame prediction to evaluate the potential outcomes of a set of available actions. Similarly, a real or virtual camera's near-future trajectory may be predicted from prior observations. Predicting the depth map for future frames instead of the input frame allows for capturing the motion of dynamic objects in the scene. The approach can also be applied to anomaly detection. For example, the next frame prediction can be superimposed upon an actually observed frame and analyzed for mismatches in the scene topology (depth) or appearance (e.g. RGB frame or frame based on other pixel values). A large mismatch may be an indication of an object moving with an unexpected velocity, and may be used as a warning signal, for example for safer navigation in a vehicle or for other purposes.

The techniques in this disclosure may be used in particular in vehicles and robotics. Driverless vehicles and robots can, for example, be enabled to predict the consequences of movements or other actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 including FIGS. 4A, 4B, 4C, and 4D illustrates an example image prediction produced by the image prediction system.

Like reference numbers and designations in the various drawings indicate like elements.

DETAIL DESCRIPTION

This specification describes an image prediction system implemented as computer programs on one or more computers in one or more locations that includes an image depth prediction neural network.

Figure 1:
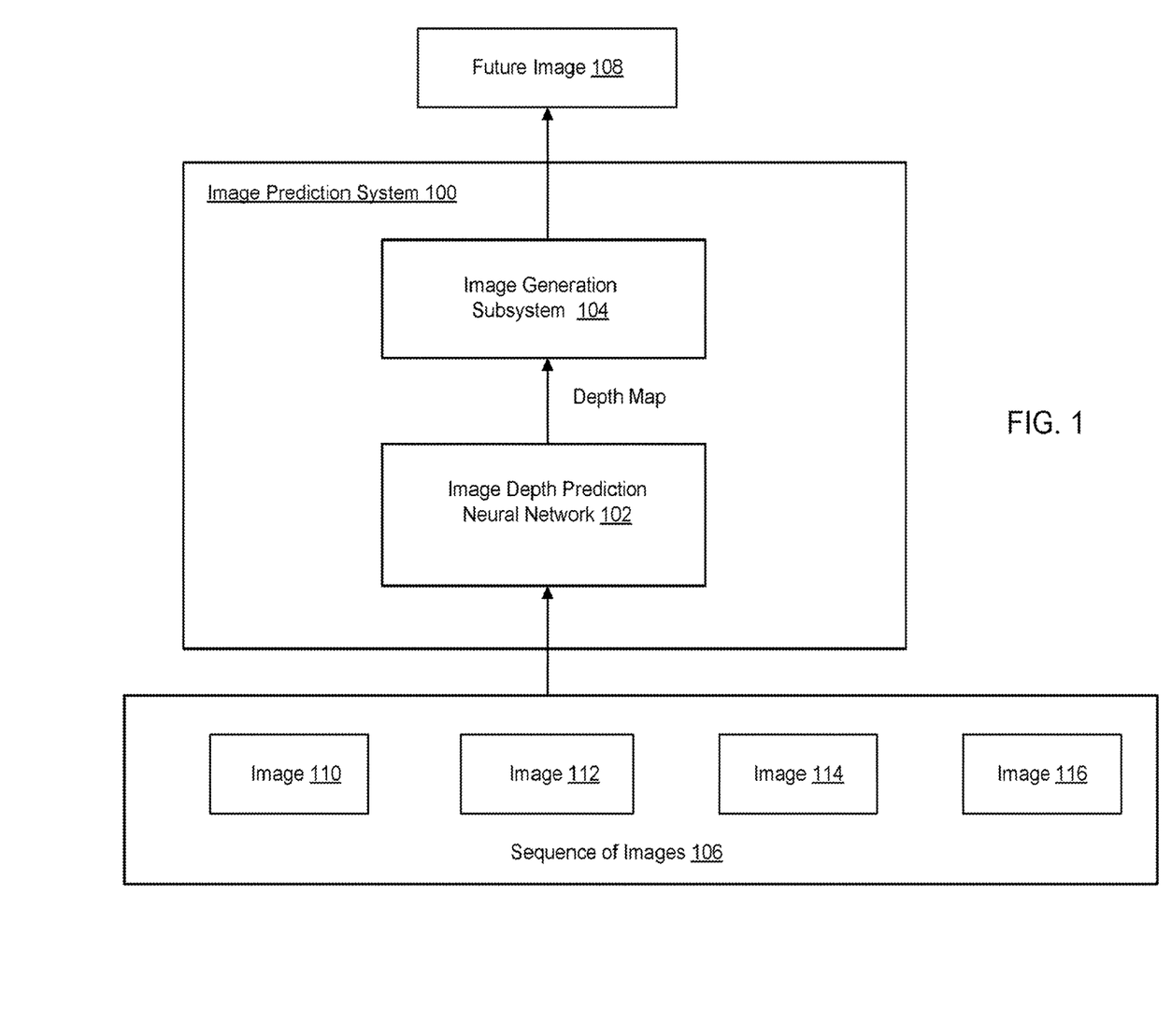
FIG. 1 is a block diagram of an example of an image prediction system.

FIG. 1 shows an example image prediction system 100. The system 100 is an example of a system implemented as computer programs on one or more computers in one or more locations, in which the systems, components, and techniques described below can be implemented.

In general, the image prediction system 100 is configured to receive a sequence of images 106 and to process the sequence of images 106 to generate, for each image in the sequence, an output image that is a prediction of a future image in the sequence of images. For example, the sequence of images 106 may include frames of video being captured by the camera of a robotic agent and a future image may be an image that will be captured by the camera of the robotic agent in the future. A future image can be, for example, an image that immediately follows the current image in the sequence, an image that is three images after the current image in the sequence, or an image that is five images after the current image in the sequence in the sequence.

To generate a prediction of a future image, the image prediction system 100 includes an image depth prediction neural network 102 and an image generation subsystem 104. Generally, the image depth prediction neural network 102 is a recurrent neural network that includes one or more convolutional long short-term memory (LSTM) neural network layers and, optionally, one or more feedforward convolutional neural network layers. The structure of the image depth prediction neural network 102 is described in more detail below with reference to FIG. 2. The image depth relates to the topology of the scene captured in the image. A depth map comprises a depth value for each pixel in the image. The depth value of a pixel is a representation of a perpendicular distance between a plane in which the image is recorded, and the actual or virtual location of an object or part of an object that the pixel represents. The plane in which the image is recorded may be a focal plane, for example, the focal plane of a camera or virtual camera.

In an embodiment, the image depth prediction neural network 102 is configured to receive an image and to derive a depth map from that image. In an embodiment, this is achieved by training the neural network using images with known depths, wherein the known depth is referred to a ground truth.

At each time step, the image depth prediction neural network 102 is configured to receive an image in the sequence of images 106. The neural network 102 then processes the image using neural network layers including one or more convolutional LSTM neural network layers to generate a depth prediction for the image. Each convolutional LSTM neural network layer in the neural network 102 has a state that is updated at each time step. Once an image is received, the neural network 102 processes the image to update the current states of the convolutional LSTM neural network layers and to generate a depth prediction for the current image. The updated states of the convolutional LSTM neural network layers are used for generating a depth prediction for subsequent images. As the states of convolutional LSTM neural network layers are updated at each time step and therefore include depth information of all previous images in the sequence, the neural network 102 can predict depth from multiple images in a sequence of images (e.g., in a video) rather than from a single still image as in existing methods. As a result, the neural network 102 can generate, from the predicted depth, a more accurate and realistic future image with significantly higher quality and sharpness compared to existing methods.

In particular, in some cases, for a given image in the sequence of images 106 (e.g., the image 112), the neural network 102 generates a depth prediction that includes a depth map characterizing a current depth of the current image 112, and the image generation subsystem 104 generates a future depth map of a future image (e.g., the future image 108) from the current depth map of the current image 112 using transformation layers. Generally, a depth map for an image includes a respective depth value of each of multiple pixels in the image and each depth value represents a respective distance of a scene depicted at the pixel from a focal plane of the image. In some other cases, the neural network 102 directly generates a future depth map that characterizes a predicted depth of the future image 108. The image generation subsystem 104 then generates a prediction of the future image 108 using the predicted depth of the future image 108.

For example, in some implementations, given an image $X_{k-1}$ in a sequence of images $\{X_1, X_2, \ldots, X_{k-1}\}$, the neural network 102 is configured to generate a depth map $D_{k-1}$ characterizing a current depth of the current image $X_{k-1}$. The depth map $D_{k-1}$ is a two-dimensional (2D) image that includes multiple pixels, in which each pixel in the depth map corresponds to a different pixel in the current image and has the same 2D coordinates as its corresponding pixel in the current image. Each pixel in the depth map has a depth value that represents the depth information of its corresponding pixel in the current image, i.e. a respective distance of a scene depicted at its corresponding pixel in the current image from a focal plane of the current image.

Once the neural network 102 has generated the depth map $D_{k-1}$, the subsystem 104 uses the depth map $D_{k-1}$ and the current image $X_{k-1}$ to construct multiple three-dimensional (3D) points, each 3D point corresponding to a different pixel in the current image $X_{k-1}$. In particular, for each pixel in the multiple pixels in the current image, the subsystem uses (i) the x and y coordinates of the pixel, and (ii) the pixel's depth value obtained from the depth map $D_{k-1}$ in order to construct a 3D point. The newly constructed 3D points form a point cloud C. Each point has x, y, z coordinates, in which the x and y coordinates of the 3D point in the point cloud C are determined based on the x and y coordinates of the pixel in the current image, and the z coordinate of the 3D point is determined based on the depth value of the pixel. The 3D point is assigned the same pixel values (e.g. RGB values) as its corresponding pixel in the current image $X_{k-1}$.

In an embodiment, the subsystem 104 then applies one or more transformation layers to the 3D points to predict a future depth map that characterizes a predicted depth of a future image (e.g., a depth map $D_k$ of the future image $X_k$). In an embodiment, transforms are applied to depth maps, predicted depth maps, images or predicted images. These transforms may be layers of a neural network, for example one or more spatial transformer network layers, or they may be deterministic transforms, implemented using deterministic algorithms.

For example, the one or more transformation layers include a geometry-based transformation matrix that can be constructed as follows. Assuming the sequence of images 106 includes frames of video being captured by a camera of a robotic agent, the subsystem 104 can use camera motion between the current frame and the future frame to predict the future depth map of the future frame. In general, camera motion of the camera can be computed based on a given sequence of camera pose vectors $\{P_1, P_2, \ldots, P_k\}$. A camera pose vector $P_i$ represents a position and orientation of the camera at time step i. Specifically, a camera pose vector $P_i$ includes a 3D position and 3D orientation, i.e. yaw, pitch, and roll angles, of the camera at time step i. To predict the depth map $D_k$ of the future image $X_k$, the subsystem 104 computes, based on camera pose vectors $P_{k-1}$ and $P_k$, the camera motion between frames $X_{k-1}$ and $X_k$. The computed camera motion includes three translation components $t_x$, $t_y$, $t_z$ and three rotation components $r_x$, $r_y$, $r_z$. The subsystem 104 then computes, based on the camera motion between frame $X_{k-1}$ and $X_k$, new coordinates and orientation of the camera at time step k. Given the new coordinates and orientation of the camera, the subsystem 104 projects the point cloud C to a plane that is at a predetermined distance from the camera and is orthogonal to the camera's principal axis, which is formed by the yaw, pitch, and roll orientation angles of the camera. The subsystem 104 then updates the depth value of each projected point in the plane based on a respective newly-calculated distance from its corresponding 3D point in the point cloud C to the plane. The obtained projected points in the plane form the future depth map $D_k$ of the future frame $X_k$. The subsystem 104 then creates a prediction of the future frame $X_k$ by painting each of the projected points in the plane with the respective pixel values, such as RGB values, that were assigned to its corresponding 3D point in the point cloud C.

In some implementations, the system 100 can predict future depth maps of future images that are multiple time steps ahead, i.e. predicting $D_t$ and $X_t$ for t>k. To do this, for example, the one or more transformation layers use hypothetical camera motions of a robotic agent from time k to time t to predict the new coordinates and orientation of the camera at time step t. The subsystem 104 then projects the point cloud C to a plane that is at a predetermined distance from the camera and is orthogonal to the camera's principal axis at time step t to generate both $D_t$ and $X_t$. The hypothetical motions of the camera are modelled and estimated, for example, based on prior knowledge of the motion of the robotic agent, e.g. a moving vehicle.

In some other implementations, instead of generating a depth map for the current image, the neural network 102 can directly predict a future depth map for a future image, e.g. the future depth map $D_k$ for the future image $X_k$. The subsystem 104, where present, may then receive the future depth map and generates a prediction of the future image using the future depth map.

The system's capabilities to predict multiple images ahead are useful in many situations. For example, the system can generalize multiple images ahead and use them for detecting anomalies or surprising outcomes. In particular, the system can compare a predicted future image with an actually observed image and analyze the mismatches in the scene topology or appearance. Large mismatches may be an indication of an object moving with an unexpected velocity, and can be used as informing signals for safer navigation of the object.

Figure 2:
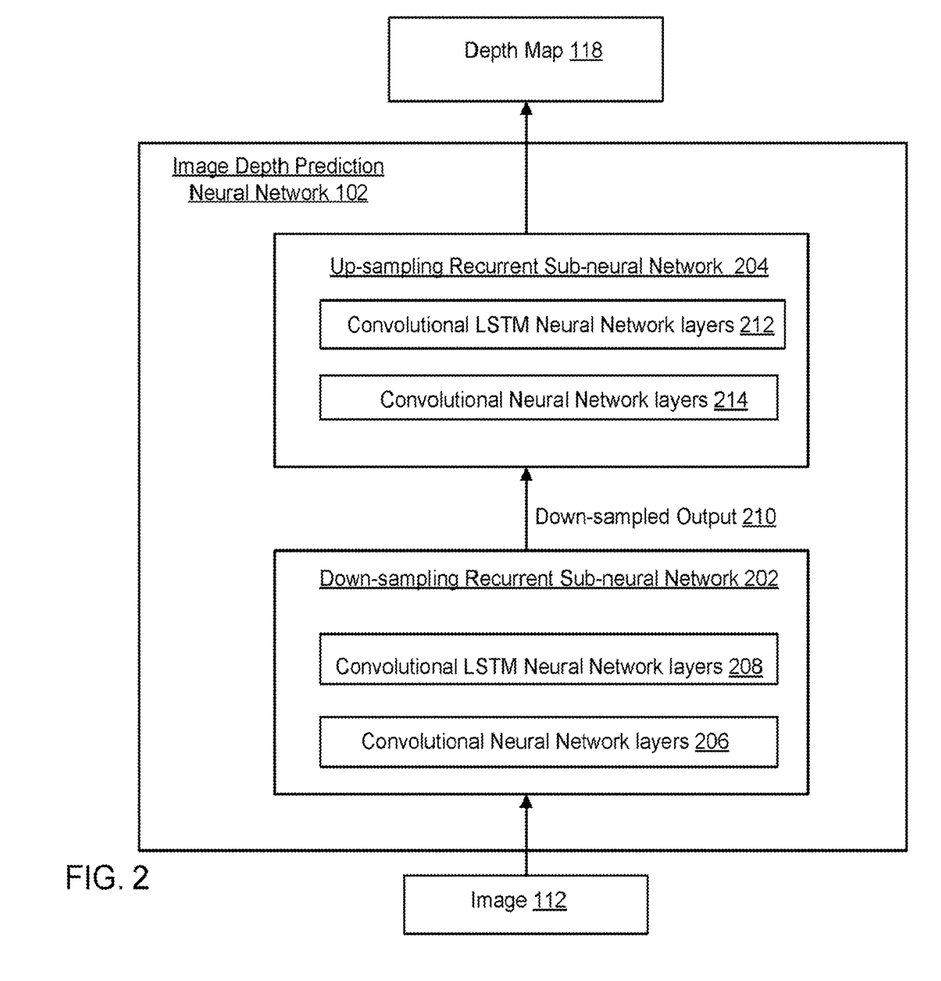
FIG. 2 is a block diagram of an example of an image depth prediction neural network.

FIG. 2. illustrates an example architecture of the image depth prediction neural network 102.

In general, the image depth prediction neural network 102 is a recurrent neural network that includes one or more convolutional long short-term memory (LSTM) neural network layers and, optionally, one or more feedforward convolutional neural network layers. The image depth prediction neural network is configured to receive a sequence of images and to generate, for each image in the sequence, a depth map that characterizes a current depth of the current image or a predicted depth of a future image. The image depth prediction neural network may be a neural network which is trained using supervised training employing image sequences associated with ground truth depth maps.

In particular, in some implementations, the image depth recurrent neural network 102 includes a down-sampling recurrent sub-neural network 202 followed by an up-sampling recurrent sub-network 204. The down-sampling recurrent sub-neural network 202 includes one or more convolutional LSTM neural network layers 208 and one or more feedforward convolutional neural network layers 206. Similarly, the up-sampling recurrent sub-neural network 204 includes one or more convolutional LSTM neural network layers 212 and one or more feedforward convolutional neural network layers 214. Convolutional LSTM neural network layers are similar to regular LSTM neural network layers, however, their gates are implemented by convolutions instead of fully-connected neural network layers. Convolutional LSTM neural network layers are described in more detail in X. Shi et al. "Convolutional LSTM network: A machine learning approach for precipitation nowcasting." NIPS, 2015.

For each image in the sequence of images, e.g., image 112, the down-sampling recurrent sub-neural network 202 is configured to process the image 112 to generate a down-sampled output 210 (e.g., a down-sized feature map) having a lower resolution than the image 112. To down-size the image 112, the down-sampling recurrent sub-neural network 202 includes one or more feedforward convolutional neural network layers with stride two. The one or more convolutional neural network layers with stride two are placed adjacent/between one or more convolutional LSTM neural network layers. For instance, the down-sampling recurrent sub-neural network 202 may include a first convolutional neural network layer with stride two followed by a first convolutional LSTM neural network layer followed by a second convolutional neural network layer with stride two followed by a second convolutional LSTM neural network layer followed by a third convolutional neural network layer with stride two followed by a third convolutional LSTM neural network layer. In some implementations, the sub-neural network 202 does not include max-pooling layers to preserve the spatial structure of the feature maps.

The up-sampling recurrent sub-neural network 204 is configured to process the down-sampled output 210 for the image 112 to generate a depth map 118. When generating the depth map, the up-sampling recurrent sub-neural network 204 up-sizes the down-sampled output 210 to reach the resolution of the image 112 by using one or more depth-to-space neural network layers with block size two that are placed adjacent to or between one or more convolutional neural network layers with stride one and one or more convolutional LSTM neural network layers. For instance, the up-sampling recurrent sub-neural network 204 may include a first depth-to-space neural network layer with block size two followed by a first convolutional neural network layer with stride one followed by a first convolutional LSTM neural network layer followed by a second depth-to-space neural network layer with block size two followed by a second convolutional neural network layer with stride one followed by a second convolutional LSTM neural network layer followed by a third depth-to-space neural network layer with block size two followed by a third convolutional neural network layer with stride one. The reference to "depth" in depth-to-space layers does not refer to image depth but instead refers to a rearranging of tensor data from a depth dimension into height and width dimensions. Generally, a depth-to-space neural network layer is configured to move values from the depth dimension in an input in spatial blocks to height and width dimensions. Depth-to-space neural network layers are described in more detail at https://www.tensorflow.org/api_docs/python/tf/depth_to_space. In some cases, depth-to-space neural network layers can be implemented as a Tensorflow (www.tensorflow.org) op tf.depth_to_space.

In an embodiment, at each time-step, the network receives one video frame and produces one depth prediction. Since the LSTM states are retained between subsequent frames, they enable the model to capture motion between two or more frames. The output of the LSTM cells are passed to the next layer, while their states are passed through time to the next frame. Therefore, the block processing frame i receives the input frame X, and the LSTM states $S_{i-1}$ as inputs, where $S_i$ is the set of LSTM states from all layers after processing frame i, and optionally $S_0=0$. Unrolling the model simplifies training. In an embodiment, although multiple copies of the network are instantiated, there is a single set of model parameters shared across the instances. In an embodiment, the model applies layer normalization (J. Ba, J. Kiros, and G. Hinton. Layer normalization. arXiv: 1607.06450, 2016) after each convolution or LSTM cell.

Optionally one or more modifications may be made as follows: skip connections are added from the encoder to the decoder. A skip connection concatenates the output of a layer in the decoder to the inputs of its corresponding similarly sized layer in the decoder. Intermediate low-resolution predictions are performed, as in Flownet (P. Fischer et al "Flownet: Learning Optical Flow with Conventional Networks" arXiv: 1504.06852, 2015). The intermediate predictions are used in the loss function as well. A fully-connected layer is added in the model bottleneck. In an embodiment, dropout is added as a fully connected network layer may result in overfitting.

For training the image depth prediction neural network 102, one or more depth prediction loss functions may be used, such as an $\mathcal{L}_2$ loss function and a reverse Huber or Berhu loss function (I. Laina et al, "Deeper Depth Prediction with Fully Convolutional Residual Networks arXiv: 1606.00373, 2016). The loss function may include a term to minimize the depth Gradient Difference Loss (GDL) (Eigen et al "Predicting Depth, Surface normal and Semantic Labels with a Common Multi-Scale Convolutional Architecture" ICCV 2015). The purpose of the GDL term is to encourage local structural similarity between predicted and ground truth depth. In an embodiment, a final loss function is formed by computing the average loss over all frames in the sequence. In an embodiment, pixels for which there is no ground truth depth are masked out.

In an embodiment, the neural network 102 can further include one or more transformation layers. For example, the one or more transformation layers may include a geometry-based transformation matrix. The one or more transformation layers can be used to generate a predicted depth of a future image from a current depth of a current image. Thus in an embodiment, the image depth prediction subsystem 102 can be trained to predict a depth map of a future image based on one or a sequence of previous images. Thus in such an embodiment, there is no necessity for the image generation subsystem 104 to be present.

Figure 3:
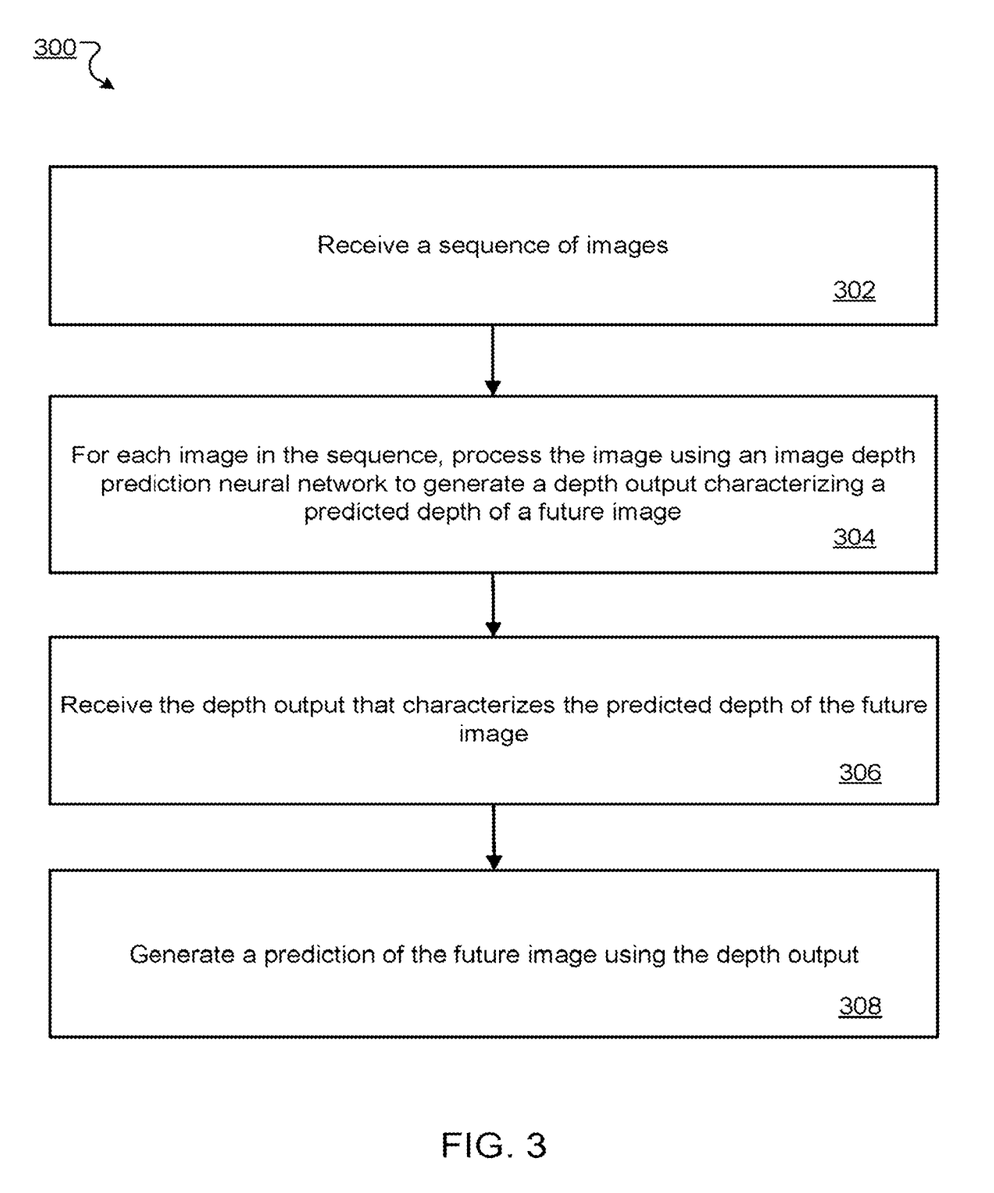
FIG. 3 is a flow diagram of an example process for processing a sequence of images to generate predictions of future images.

FIG. 3 is a flow diagram of an example process 300 for processing a sequence of images to generate predictions of future images. For convenience, the process 300 will be described as being performed by a system of one or more computers located in one or more locations. For example, an image prediction system, e.g., the image prediction system 100 of FIG. 1, appropriately programmed in accordance with this specification, can perform the process 300.

The system receives a sequence of images (step 302). For example, the sequence of images includes frames of video captured by a camera of a robotic agent.

For each image in the sequence, the system processes the image using an image depth prediction neural network to generate a prediction of a future image in the sequence (step 304). The image depth prediction neural network is a recurrent neural network that includes one or more convolutional long short-term memory (LSTM) neural network layers and, optionally, one or more feedforward convolutional neural network layers. The future image can be an image that immediately follows the current image in the sequence.

The system processes the image in accordance with a current internal state of the recurrent neural network to (i) update the current internal state and (ii) generate a depth output that characterizes a predicted depth of a future image in the sequence. The current internal state of the recurrent neural network includes current states of all convolutional LSTM neural network layers in the recurrent neural network. The recurrent neural network includes (i) a down-sampling recurrent sub-neural network that is configured to process the image to generate a down-sampled output having a lower resolution than the image, and (ii) an up-sampling recurrent sub-neural network that is configured to process the down-sampled output for the image to generate the depth output. The depth output may be a depth map that includes multiple points, each point is associated with a predicted depth value for a pixel of a plurality of pixels in the future image that represents a respective distance of a scene depicted at the pixel from a focal plane of the future image.

Next, the system receives the depth output that characterizes the predicted depth of the future image (step 306).

The system then generates a prediction of the future image using the depth output (step 308).

FIG. 4 illustrates an example next image prediction produced by an image prediction system, e.g., the image prediction system 100 of FIG. 1. FIG. 4 includes FIGS. 4A-4D.

Figure 4A:
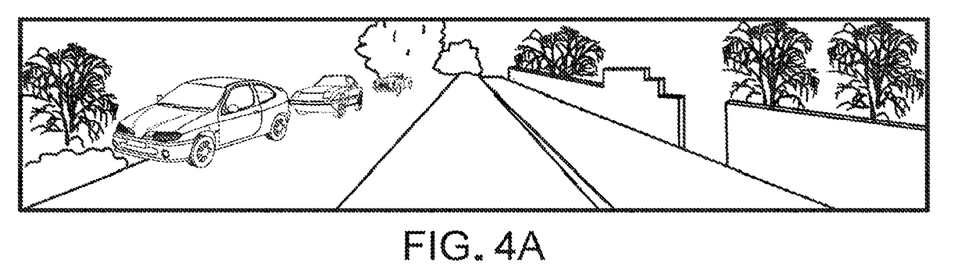
FIG. 4A shows an example of an input image from a sequence of input images.

In particular, FIG. 4A shows an example of an input image from a sequence of input images. The example input image shows a current position of a car moving on a street.

Figure 4B:
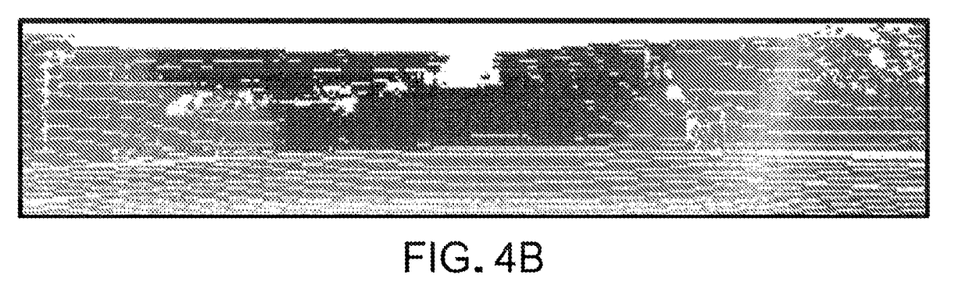
FIG. 4B shows a depth map that can be generated using the example input image.

FIG. 4B shows a depth map that can be generated using the example input image. The depth map is generated by an image depth prediction neural network of the image prediction system, e.g., the image depth prediction neural network 102 of FIG. 1.

Figure 4C:
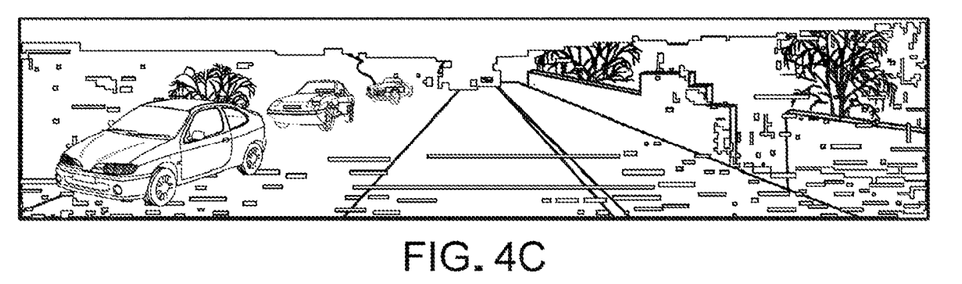
FIG. 4C shows an example prediction of a next image that can be generated by the image prediction system using the depth map.

FIG. 4C shows an example prediction of a next image that can be generated by the image prediction system using the depth map. The next image prediction shows that the car has move forward to a new position.

Figure 4D:
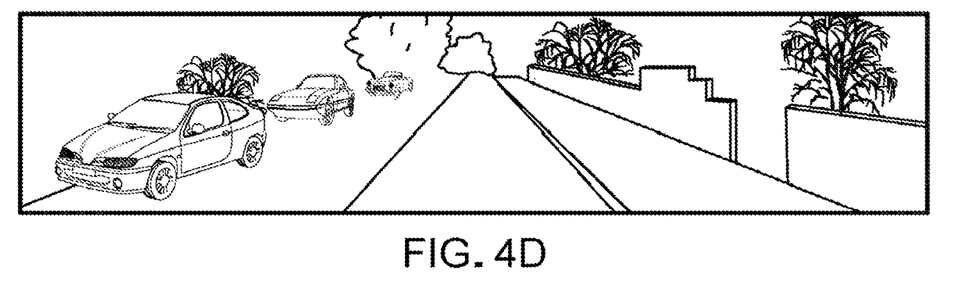
FIG. 4D is a ground truth next image following the example input image in the sequence.

FIG. 4D is a ground truth next image following the example input image in the sequence. The car in the ground truth next image has moved forward, which is accurately predicted by the image prediction system as shown in the next image prediction of FIG. 4C.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising:
an image depth prediction neural network implemented by one or more computers, wherein the image depth prediction neural network is a recurrent neural network that is configured to receive a sequence of images and, for each image in the sequence:
process the image, which is a current image at a first time step in the sequence, in accordance with a current internal state of the recurrent neural network to (i) update the current internal state and (ii) generate a current depth map that characterizes a current depth of the image in the sequence; and
an image generation subsystem configured to, for each image in the sequence:
receive the current depth map that characterizes the current depth of the image,
construct, based on the current depth map and the image, a plurality of three-dimensional (3D) points, each of the plurality of 3D points corresponding to a different pixel in the image, and
generate a depth output that characterizes a predicted depth of a future image in the sequence by applying one or more transformation layers to the plurality of 3D points, wherein the depth output comprises a set of values defining the topology of a scene represented by the future image in a third, depth dimension.

2. The system of claim 1, wherein the depth output comprises a predicted depth value for each pixel of a plurality of pixels in the future image that represents a respective distance of a scene depicted at the pixel from a focal plane of the future image.

3. The system of claim 1, wherein the future image immediately follows the image in the sequence of images.

4. The system of claim 1, wherein the sequence of images are frames of video captured by a camera of a robotic agent.

5. The system of claim 1, wherein the image depth prediction neural network comprises one or more convolutional long short-term memory (LSTM) neural network layers.

6. The system of claim 1, wherein the image depth prediction neural network comprises one or more feedforward convolutional neural network layers.

7. The system of claim 1, wherein the image depth prediction neural network comprises:
a down-sampling recurrent sub-neural network followed by an up-sampling recurrent sub-neural network,
wherein the down-sampling recurrent sub-neural network is configured to, for each image in the sequence:
process the image to generate a down-sampled output having a lower resolution than the image, and
wherein the up-sampling recurrent sub-neural network is configured to, for each image in the sequence:
process the down-sampled output for the image to generate the current depth map of the image.

8. A method comprising:
receiving a sequence of images; and
for each image in the sequence:
processing the image using an image depth prediction neural network,
wherein the image depth prediction neural network is a recurrent neural network that is configured to, for each image in the sequence:
process the image, which is a current image at a first time step in the sequence, in accordance with a current internal state of the recurrent neural network to (i) update the current internal state and (ii) generate a current depth map that characterizes a current depth of the image in the sequence;
receiving the current depth map that characterizes the current depth of the image,
constructing, based on the current depth map and the image, a plurality of three-dimensional (3D) points, each of the plurality of 3D points corresponding to a different pixel in the image, and
generating a depth output that characterizes a predicted depth of a future image in the sequence by applying one or more transformation layers to the plurality of 3D points, wherein the depth output comprises a set of values defining the topology of a scene represented by the future image in a third, depth dimension.

9. The method of claim 8, wherein the depth output comprises a predicted depth value for each pixel of a plurality of pixels in the future image that represents a respective distance of a scene depicted at the pixel from a focal plane of the future image.

10. The method of claim 8, wherein the future image immediately follows the image in the sequence of images.

11. The method of claim 8, wherein the sequence of images are frames of video captured by a camera of a robotic agent.

12. The method of claim 8, wherein the image depth prediction neural network comprises one or more convolutional long short-term memory (LSTM) neural network layers.

13. The method of claim 8, wherein the image depth prediction neural network comprises one or more feedforward convolutional neural network layers.

14. The method of claim 8, wherein the image depth prediction neural network comprises:
a down-sampling recurrent sub-neural network followed by an up-sampling recurrent sub-neural network,
wherein the down-sampling recurrent sub-neural network is configured to, for each image in the sequence:
process the image to generate a down-sampled output having a lower resolution than the image, and wherein the up-sampling recurrent sub-neural network is configured to, for each image in the sequence:
process the down-sampled output for the image to generate the current depth map.

15. One or more non-transitory computer storage media encoded with instructions that, when executed by one or more computers, cause the one or more computers to perform operations comprising:
receiving a sequence of images; and
for each image in the sequence:
processing the image using an image depth prediction neural network,
wherein the image depth prediction neural network is a recurrent neural network that is configured to, for each image in the sequence:
process the image, which is a current image at a first time step in the sequence, in accordance with a current internal state of the recurrent neural network to (i) update the current internal state and (ii) generate a current depth map that characterizes a current depth of the image in the sequence;
receiving the current depth map that characterizes the current depth of the image,
constructing, based on the current depth map and the image, a plurality of three-dimensional (3D) points, each of the plurality of 3D points corresponding to a different pixel in the image, and
generating a depth output that characterizes a predicted depth of a future image in the sequence by applying one or more transformation layers to the plurality of 3D points, wherein the depth output comprises a set of values defining the topology of a scene represented by the future image in a third, depth dimension.

16. The one or more non-transitory computer storage media of claim 15, wherein the depth output comprises a predicted depth value for each pixel of a plurality of pixels in the future image that represents a respective distance of a scene depicted at the pixel from a focal plane of the future image.

17. The one or more non-transitory computer storage media of claim 15, wherein the future image immediately follows the image in the sequence of images.

18. The one or more non-transitory computer storage media of claim 15, wherein the image depth prediction neural network comprises one or more convolutional long short-term memory (LSTM) neural network layers.

19. The one or more non-transitory computer storage media of claim 15, wherein the image depth prediction neural network comprises one or more feedforward convolutional neural network layers.

20. The one or more non-transitory computer storage media of claim 15, wherein the image depth prediction neural network comprises:
a down-sampling recurrent sub-neural network followed by an up-sampling recurrent sub-neural network,
wherein the down-sampling recurrent sub-neural network is configured to, for each image in the sequence:
process the image to generate a down-sampled output having a lower resolution than the image, and
wherein the up-sampling recurrent sub-neural network is configured to, for each image in the sequence:
process the down-sampled output for the image to generate the current depth map.

* * * * *